United States Patent [19]

Hunsbedt et al.

[11] Patent Number: 4,643,870
[45] Date of Patent: Feb. 17, 1987

[54] HEAT DISSIPATING NUCLEAR REACTOR

[75] Inventors: Anstein Hunsbedt, Los Gatos; Jonathan D. Lazarus, Sunnyvale, both of Calif.

[73] Assignee: The United States of America as represented by the United States Department of Energy, Washington, D.C.

[21] Appl. No.: 800,566

[22] Filed: Nov. 21, 1985

[51] Int. Cl.$^4$ ................................................. G21C 9/00
[52] U.S. Cl. ..................................... 376/280; 376/273; 376/293
[58] Field of Search ......................... 376/273, 280, 293

[56] References Cited

U.S. PATENT DOCUMENTS

| | | | |
|---|---|---|---|
| 3,158,546 | 11/1964 | Cordova | 376/273 |
| 3,607,630 | 9/1971 | West et al. | |
| 3,629,064 | 12/1971 | Zivi | |
| 4,073,682 | 2/1978 | Barleon et al. | |
| 4,146,429 | 3/1979 | Slagley | |
| 4,240,875 | 12/1980 | Katscher | 376/280 |
| 4,289,582 | 9/1981 | Parr et al. | 376/280 |
| 4,313,795 | 2/1982 | Dauverque | |

FOREIGN PATENT DOCUMENTS 2622050 12/1977 Fed. Rep. of Germany ...... 376/280

Primary Examiner—Deborah L. Kyle
Assistant Examiner—Richard W. Wendtland
Attorney, Agent, or Firm—L. E. Carnahan; Roger S. Gaither; Judson R. Hightower

[57] ABSTRACT

Disclosed is a nuclear reactor containment adapted to retain and cool core debris in the unlikely event of a core meltdown and subsequent breach in the reactor vessel. The reactor vessel is seated in a cavity which has a thick metal sidewall that is integral with a thick metal basemat at the bottom of the cavity. The basemat extends beyond the perimeter of the cavity sidewall. Underneath the basemat is a porous bed with water pipes and steam pipes running into it. Water is introduced into the bed and converted into steam which is vented to the atmosphere. A plurality of metal pilings in the form of H-beams extends from the metal base plate downwardly and outwardly into the earth.

13 Claims, 1 Drawing Figure

U.S. Patent Feb. 17, 1987 4,643,870
FIGURE
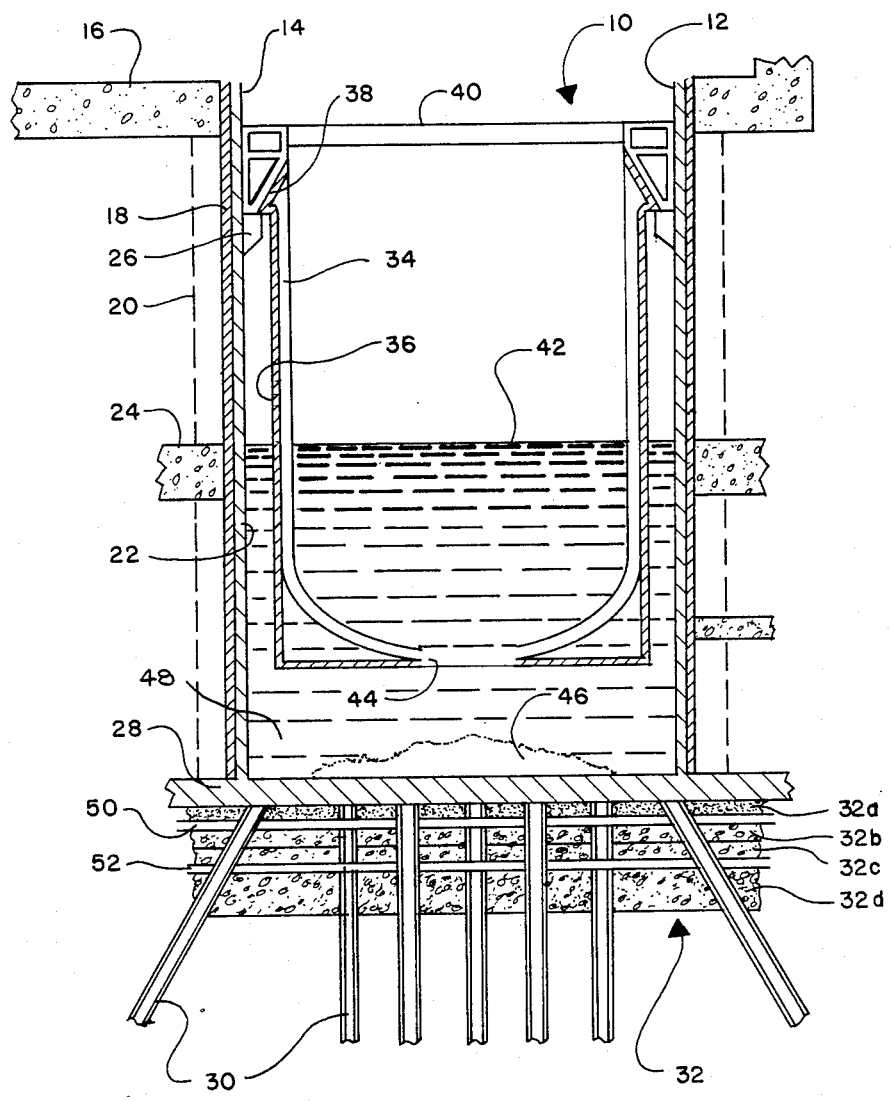

HEAT DISSIPATING NUCLEAR REACTOR

BACKGROUND OF THE INVENTION

1. Government Rights

The invention described herein arose in the course of, or under, contract number DE-AT03-76SF71032 between the U.S. Department of Energy and the General Electric Corporation.

2. Field of the Invention

This invention relates to nuclear reactors, and particularly, to how nuclear reactor containment structures may dissipate heat following an extremely low probability meltdown and subsequent breach in the reactor vessel.

3. Background Discussion

Because radioactive materials are contained in a nuclear reactor, great caution must be taken to prevent the escape of such materials to the environment. One type of nuclear reactor is the liquid metal fast-breeder reactor which employs a core immersed in liquid sodium coolant. If all heat removal capacity were lost and the temperature within the reactor should exceed the melting point of the core, the core would disintegrate and core materials could reach the bottom of the reactor, where the debris layer heat generation rate could be sufficiently high to melt the walls of the reactor vessel and guard vessel. If this would occur both sodium and fragmented, radioactive core debris would escape from the reactor vessel. The reactor containment must be designed to retain such radioactive materials which might penetrate the reactor vessel, and prevent their entry into the environment where they can endanger public health & safety. The present invetion provides a safe containment structure which has the advantages of a system for cooling the containment structure and retained core debris to provide protection in the extremely unlikely event of a breach of the reactor vessel, so that failure of the containment by the core debris interactions is avoided.

BRIEF DESCRIPTION OF THE INVENTION

The nuclear reactor of this invention includes a reactor vessel disposed in a thick-walled metal cavity. This cavity is preferably lodged partially or completely below the surface of the earth. Preferably it is tied to adjacent structural concrete. Preferably, the reactor vessel is seated in a guard vessel and both of these are seated within the surrounding metal cavity. There is a thick metal basemat beneath the reactor vessel at the bottom of the cavity. The cavity wall, at the bottom abutting the basemat, is welded or otherwise integral with the metal basemat.

Disposed in the zone below the basemat and adjacent to it, are means for feeding water into this region. The zone immediately underneath the base plate is composed of porous media such as sand and gravel. If there is a core meltdown and subsequent breach in the reactor vessel, this zone below the basemat will eventually be heated above the boiling point of water. Water fed into the heated zone will be converted into steam. Its latent heat of vaporization provides cooling of both the basemat and contained core debris. Means are provided for venting the steam to the atmosphere as it is formed. The metal base plate preferably extends beyond the perimeter of the cavity wall and it is supported on metal pilings which preferably extend downwardly and outwardly into the earth. The metal pilings serve to conduct heat away from the reactor into water-saturated porous media and earth beneath. At the same time they support the reactor and prevent it from sinking into the earth.

BRIEF DESCRIPTION OF THE DRAWING

The FIGURE is a schematic illustration of the nuclear reactor containment of this invention, shown in cross-section. The reactor is depicted as having a breach in the reactor vessel, with the core debris and liquid metal coolant drained out of the reactor vessel and retained in the metal containment cavity.

DETAILED DESCRIPTION OF THE DRAWINGS

As shown in the FIGURE, the nuclear reactor 10 of this invention has a generally cylindrical shape and is disposed in a cavity 12 formed by excavation. Surrounding the top entryway 14 to the cavity 12 is adjacent concrete slab 16, with an opening to the cavity which receives the nuclear reactor.

The cavity is lined with thermal insulation or a cooling jacket 18 which is surrounded by biological shielding 20, such as concrete. Along the cavity sidewall 22 are adjacent concrete structures 24, which are tied to the metal cavity by members penetrating the cooling jacket 18. The cavity sidewall 22 nominally is an 8-inch thick steel cylindrical member, which has at its upper portion an annular rim 26 which is welded or otherwise secured to the sidewall 22.

The bottom of the cavity 12 is a 3-foot nominal thickness metal basemat 28. This basemat 28 is welded to, or integral with the bottom perimeter of the sidewall 22 and provides a heat conducting floor for the reactor 10. This metal basemat 28 extends outwardly from the perimeter of the sidewall 22 to a diameter of approximately 200 feet. Extending downwardly and outwardly from the basemat 28 are a plurality of metal pilings 30. These pilings 30 are preferably H-beams driven to refusal. They thus not only support the reactor 10, but because they are metal, provide heat dissipating means for dispersing heat emminating from the nuclear reactor. Underneath the metal basemat 28 is a porous sand and gravel bed 32, filing the hot zone. This bed 32 has an upper level 32a of fine sand about 1 foot in depth, an intermediate level 32b of coarse sand about 1 foot thick, underlain by fine gravel 32c about 4 feet in depth, and a lower level 32d of a coarse gravel about 6 feet in depth. The nuclear reactor 10 itself includes a reactor vessel 34 seated within a guard vessel 36 which has a lip 38 which rests on top of the rim 26. The top of the reactor vessel 34 has a cover 40 which covers it. The reactor vessel 34 has extending through this cover 40 a plurality of control, instrumentation, heat exchange and pumping apparatus (not shown). Liquid sodium 42 normally surrounds the core in the reactor vessel and serves as a cooling medium. If control over the reactor is lost and it generates much more heat than can be dissipated, the core melts, disintegrates, and falls to the bottom of the vessel. The high temperatures arising from a melted core, if sustained, will result in melting and breach of the reactor vessel and guard vessel. This is illustrated by the openings 44 in the bottoms of the reactor vessel 34 and guard vessel 36, showing the core debris 46 which has fallen from the reactor vessel and guard vessel in a heap on the basemat 28.

The liquid sodium 42 will also leak from the reactor vessel 34 and fill the bottom of the metal cavity 48 with liquid sodium. Under the conditions illustrated, the temperature of the basemat and cavity walls is very high, for example 1300° F. The heat generated by the core debris must be dissipated, otherwise the metal basemat 28 would eventually melt. According to this invention, the metal basemat 28 and projecting pilings 30 provide one way of eliminating this excess heat. A second way is provided by boiling water injected into the porous hot zone. This is accomplished by two series of perforated pipes 50 and 52. The upper series of pipes 50, which are generally disposed horizontally, serve as steam vents. The lower series of pipes 52, also disposed horizontally, are water pipes. Water flows through the second series of pipes 52 and floods the hot porous zone 32 with water. The water absorbs heat in boiling, and the resulting steam is carried away and vented to the atmosphere by the first series of pipes 50.

The nuclear reactor containment of this invention provides improved safety in the event of a breach in the reactor. The metal basemat 28 and metal pilings 30 serve to dissipate heat, and the conversion of the water to steam also dissipates heat. The reactor vessel 34 is housed in a cavity 12 which retains radioactive coolant and core debris, thus preventing their escape to the environment. The metal basemat and sidewalls eliminate the possibility of contact between liquid sodium coolant and concrete, which contact results in energetic chemical reaction, and evolution of explosive hydrogen gas. All of these features enhance the safety of the reactor 10 of this invention.

SCOPE OF THE INVENTION

The above description presents the best mode contemplated of carrying out the present invention as depicted by the embodiment disclosed. The features illustrated by this embodiment provide the advantages of this invention. This invention is, however, susceptible to modifications and alternate constructions from the embodiment shown in the drawing and above description. Consequently, it is not the intention to limit it to the particular embodiment disclosed. On the contrary, the intention is to cover all modifications and alternates falling within the scope of the invention as generally expressed by the following claims.

What is claimed is:

1. A nuclear reactor containment comprising:
reactor vessel disposed in a metal cavity located partially or completely below the surface of the earth in a cavity,
a guard vessel, said reactor vessel being positioned within said guard vessel,
a thick metal basemat beneath the reactor vessel and guard vessel and at the bottom of the cavity,
means located below the basemat but adjacent to it for feeding water to a porous media situated in a zone immediately underneath the basemat, said water being converted to steam when the temperature of said zone exceeds the boiling point of water,
means for venting the steam so formed to the atmosphere, and
means in contact with said basemat for supporting same and for conducting heat therefrom.

2. The reactor of claim 1 wherein the reactor vessel is disposed in a cavity having a thick metal sidewall.

3. The reactor of claim 2 wherein the metal cavity wall is integral with the metal basemat.

4. The reactor of claim 1 wherein said means for supporting the metal basemat comprises a plurality of metal piling means in contact with said basemat and which extend downwardly and outwardly into the earth, and additionally serve to conduct heat away from the reactor vessel and into underlying porous media and earth.

5. The reactor of claim 4 wherein the metal piling means are in the form of metal H-beams.

6. The reactor of claim 1 wherein the means for feeding water comprise a first series of perforated pipe means disposed horizontally under the metal basemat and the steam venting means comprise a second series of perforated pipe means disposed horizontally above the first series of pipe means.

7. The reactor of claim 6 wherein the first and second series of pipe means are buried in porous media.

8. A nclear reactor containment comprising:
a reactor vessel disposed in a cavity, said cavity having a thick metal sidewall,
a guard vessel positioned around said reactor vessel and sapced from said sidewall,
a thick metal basemat beneath the reactor vessel and guard vessel and at the bottom the cavity and extending beyond the perimeter of the cavity sidewall, and a bed of particulate, refractory material underlying the metal basemat,
means disposed in said bed for introducing water into the bed, said water being converted to steam when the temperature of the bed is above the boiling point of water,
means disposed in the bed for venting the steam so formed to the atmosphere, and
metal piling means contacting the basemat and extending downwardly through the bed, into the earth for supporting the basemat.

9. The reactor of claim 8 wherein the metal basemat is integral with the metal cavity sidewall.

10. The reactor of claim 8, wherein said means for introducing water into the bed comprises a first series of perforated pipes, and wherein said means for venting the steam comprises a second series of perforated pipes located above said first series of perforated pipes.

11. The reactor of claim 8, wherein said metal piling means comprises a plurality of metal pilings in the form of H-shaped metal beams, each of said beams having one end thereof in contact with said basemat.

12. The reactor of claim 8, wherein said metal sidewall has a thickness of about eight inches, and wherein said basemat has a thickness of about three feet.

13. The reactor of claim 8, wherein said bed of material comprises an upper layer of fine material, an intermediate layer of coarse material, said intermediate layer being underlain by a layer of finer material having a thickness greater than said intermediate layer, and a lower layer of coarse material having a thickness greater than said layer of finer material.

* * * * *